United States Patent
Sagawa (10) Patent No.: US 9,937,758 B2
(45) Date of Patent: Apr. 10, 2018

(54) PNEUMATIC TIRE

(71) Applicant: SUMITOMO RUBBER INDUSTRIES, LTD., Kobe-shi, Hygo (JP)

(72) Inventor: Takamichi Sagawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 377 days.

(21) Appl. No.: 14/780,338

(22) PCT Filed: Jan. 29, 2014

(86) PCT No.: PCT/JP2014/051960
§ 371 (c)(1),
(2) Date: Sep. 25, 2015

(87) PCT Pub. No.: WO2014/156283
PCT Pub. Date: Oct. 2, 2014

(65) Prior Publication Data
US 2016/0075190 A1    Mar. 17, 2016

(30) Foreign Application Priority Data

Mar. 26, 2013  (JP) .................................. 2013-064673

(51) Int. Cl.
*B60C 15/00* (2006.01)
*B60C 15/06* (2006.01)
*B60C 17/00* (2006.01)

(52) U.S. Cl.
CPC ...... *B60C 15/0628* (2013.01); *B60C 15/0036* (2013.01); *B60C 15/0603* (2013.01);
(Continued)

(58) Field of Classification Search
CPC ...... B60C 15/00; B60C 15/06; B60C 15/0628
See application file for complete search history.

(56) References Cited

U.S. PATENT DOCUMENTS

2003/0102088 A1    6/2003  Iiduka
2006/0048874 A1    3/2006  Maruoka
(Continued)

FOREIGN PATENT DOCUMENTS

EP    0 947 358 A1    10/1999
EP    1 016 555 A2     7/2000
(Continued)

*Primary Examiner* — Justin R Fischer
(74) *Attorney, Agent, or Firm* — Birch, Stewart, Kolasch & Birch, LLP (57) ABSTRACT

A pneumatic tire 1 having a toroidal carcass 6 extending from a tread portion 2 through a sidewall portion 3 to a bead core 5 in a bead portion 4, is provided in the bead portion 4 with a bead reinforcing rubber layer 10 along an outer surface in the tire axial direction of the carcass 6. The bead reinforcing rubber layer 10 is formed from a band-like rubber strip 15 wound spirally circumferentially of the tire. In a tire meridian section including the tire rotational axis, each of the inner surface Si and the outer surface So in the tire axial direction of bead reinforcing rubber layer 10 has adjacent rubber strip 15's interfaces 16, and the number of the interfaces 16 on the inner surface Si is smaller than the number of the interfaces 16 in the outer surface So.

14 Claims, 4 Drawing Sheets

(52) U.S. Cl.
CPC .... *B60C 17/0009* (2013.01); *B60C 2015/065* (2013.01); *B60C 2015/0621* (2013.01); *B60C 2015/0678* (2013.01)

(56) References Cited

U.S. PATENT DOCUMENTS

| | | |
|---|---|---|
| 2008/0156407 A1 | 7/2008 | Sakamoto et al. |
| 2010/0147439 A1 | 6/2010 | Koeune et al. |
| 2012/0048435 A1 | 3/2012 | Kuroki |

FOREIGN PATENT DOCUMENTS

| | | |
|---|---|---|
| EP | 1 358 998 A1 | 11/2003 |
| EP | 1 630 003 A1 | 3/2006 |
| EP | 2 196 334 A2 | 6/2010 |
| EP | 2 418 103 A1 | 2/2012 |
| JP | 2006-62518 A | 3/2006 |
| JP | 2008-162137 A | 7/2008 |
| JP | 2010-137853 A | 6/2010 |
| JP | 2010-264920 A | 11/2010 |
| JP | 2012-25280 A | 2/2012 |
| WO | WO 02/060676 A1 | 8/2002 |

PNEUMATIC TIRE

TECHNICAL FIELD

The present invention related to a pneumatic tire including a bead reinforcing rubber layer, more particularly to a pneumatic tire including a bead reinforcing rubber layer formed from a band-like rubber strip.

BACKGROUND ART

A pneumatic tire having a carcass toroidally extending between bead portions has been known. The following patent document 1 proposes a pneumatic tire provided with a bead reinforcing rubber layer on the outer surface in the tire axial direction of the carcass in the bead portion. The bead reinforcing rubber layer controls distortion of the bead portion so that the durability of the bead portion is improved.

The following patent document 2 proposes to form a bead reinforcing rubber layer by a strip winding method so that the shape can be flexibly changed according to a tire size and the like.

In a strip winding method, for example, a target raw (unvulcanized) reinforcing rubber layer is formed by winding a band-like rubber strip, which is unvulcanized and whose width is about 5 to 30 mm, spirally circumferentially of the tire. In the raw reinforcing rubber layer, each rubber strip is integrated by being vulcanized. A reinforcing rubber layer formed through a strip winding method comprises adjacent rubber strip's interfaces. The interfaces extend in the tire circumferential direction along the surface of the reinforcing rubber layer.

PRIOR ART DOCUMENT

Patent Document

Patent document 1: Japanese Patent Application Publication No. 2010-137853
Patent document 2: Japanese Patent Application Publication No. 2008-162137

SUMMARY OF THE INVENTION

Problems to be Solved by the Invention

A load (for example, vertical load) applied to the tread portion of a tire acts on a bead reinforcing rubber layer through a carcass. Especially, on the inner surface in the tire axial direction of a bead reinforcing rubber layer, a large tensile stress acts. In a bead reinforcing rubber layer formed by a strip winding method, therefore, a larger tensile stress acts on the interfaces appearing in the inner surface thereof, and there have been a problem such that damage is liable to occur at the interfaces.

The present invention was made with the view toward the above-mentioned problem, and a primary object is to provide a pneumatic tire, in which durability performance of a bead reinforcing rubber layer formed by a strip winding method can be improved.

Means of Solving the Problems

The present invention is a pneumatic tire having a toroidal carcass extending from a tread portion to a bead core in a bead portion through a sidewall portion, and characterized in that the bead portion is provided with a bead reinforcing rubber layer disposed along an outer surface in the tire axial direction of the carcass, the bead reinforcing rubber layer is formed from a band-like rubber strip wound spirally circumferentially of the tire, in a tire meridian section including the tire rotational axis, an inner surface and an outer surface in the tire axial direction of the bead reinforcing rubber layer each have adjacent rubber strip's interfaces, and the number of the interfaces in the inner surface is smaller than the number of the interfaces in the outer surface.

In the pneumatic tire of the present invention, it may be possible that the bead reinforcing rubber layer comprises an inside laminated body comprising the inner surface and an outside laminated body comprising the outer surface, and an helical pitch P1 of the rubber strip of the inside laminated body is more than an helical pitch P2 of the rubber strip of the outside laminated body.

In the pneumatic tire of the present invention, it may be possible that the inside laminated body comprises a rubber strip wound from the outside to the inside in the tire radial direction, the outside laminated body comprises a rubber strip wound from the inside to the outside in the tire radial direction, and the inside laminated body and the outside laminated body is formed from a single continuous rubber strip.

In the pneumatic tire of the present invention, it may be possible that, in the inside laminated body, the ratio (P1/w) of the helical pitch P1 of the rubber strip and the width w of the rubber strip is set in a range of 0.5 to 0.8.

In the pneumatic tire of the present invention, it may be possible that the width of the rubber strip is set in a range of 5 to 30 mm.

In the pneumatic tire of the present invention, it may be possible that a hardness of rubber of the strip laminated body is 60 to 100 degrees.

Effects of the Invention

The bead portion of the pneumatic tire of the present invention is provided with the bead reinforcing rubber layer along the outer surface in the tire axial direction of the carcass. The bead reinforcing rubber layer is formed from the band-like rubber strip wound spirally circumferentially of the tire. In the tire meridian section including the tire rotational axis, each of the inner surface and the outer surface in the tire axial direction of the bead reinforcing rubber layer has the adjacent rubber strip's interfaces, and the number of the interfaces in the inner surface is smaller than the number of the interfaces in the outer surface.

In the pneumatic tire according to the present invention, therefore, the durability performance can be improved by preventing the bead reinforcing rubber layer from separating since the inner surface of the bead reinforcing rubber layer on which large tensile stress liable to act has less interfaces.

BRIEF EXPLANATION OF THE DRAWINGS

FIG. 4

(A) is a cross sectional view of the inside laminated body of the bead reinforcing rubber layer in a manufacturing process therefor, (B) is a cross sectional view of the outside laminated body of the bead reinforcing rubber layer in a manufacturing process therefor.

MODE FOR CARRYING OUT THE INVENTION

An embodiment of the present invention is described hereinafter, based on the drawings.

Figure 1:
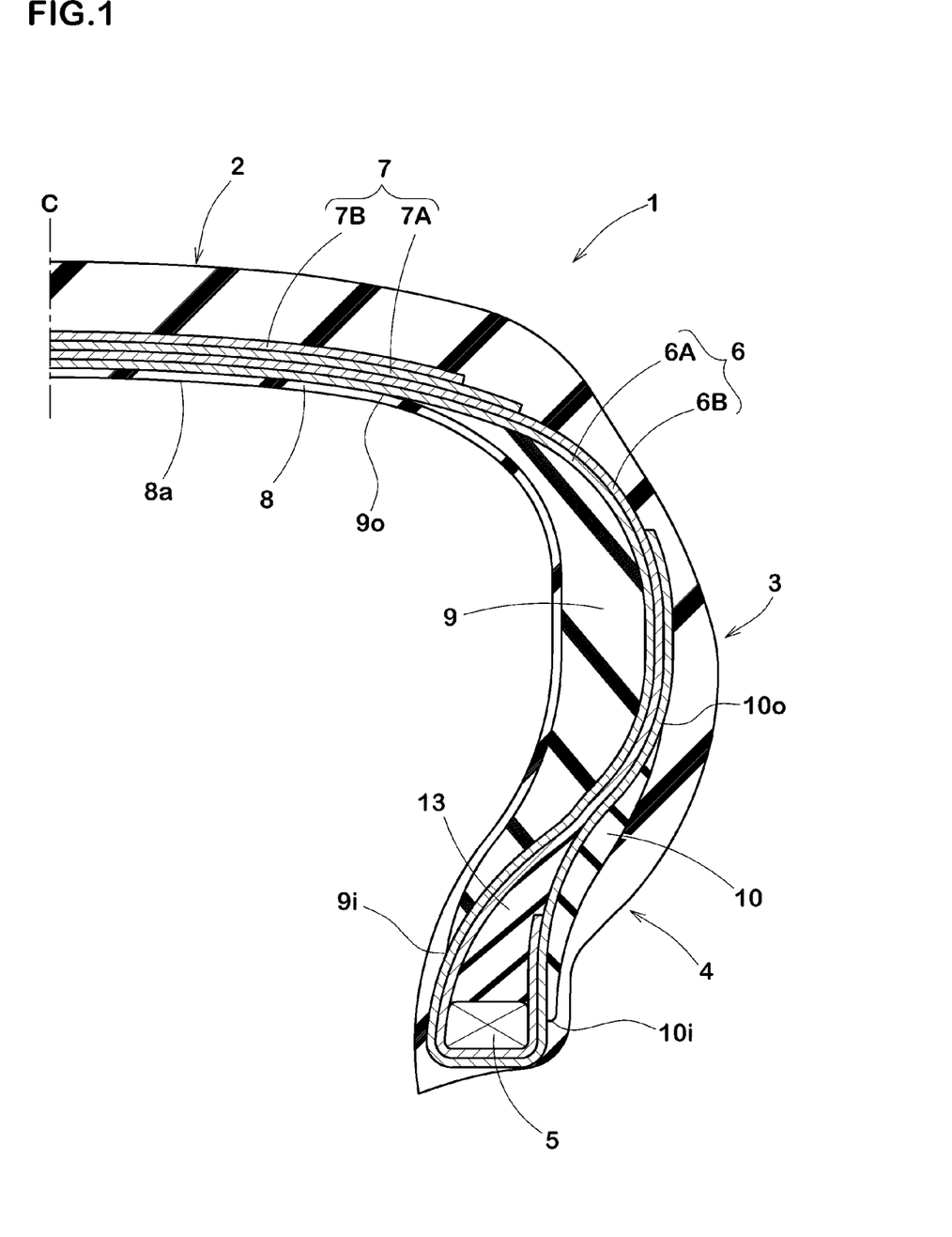
FIG. 1
A cross sectional view of a pneumatic tire showing an embodiment of the present invention.

In FIG. 1, there is shown a meridian cross sectional view, including the tire rotational axis, of the pneumatic tire in this embodiment (hereinafter, simply referred to as "tire" depending on circumstances) 1.
As shown in FIG. 1, the tire 1 has a toroidal carcass 6 extending from a tread portion 2 to a bead core 5 in a bead portion 4 through a sidewall portion 3.

Further, the tire 1 has a belt layer 7 disposed outside the carcass 6 in the tire radial direction, an inner liner 8 disposed on the inside of the carcass 6 so as to form the tire inner surface 8a, a side reinforcing rubber layer 9 disposed inside the carcass 6 in the tire axial direction in the sidewall portion 3, and a bead reinforcing rubber layer 10 disposed outside the carcass 6 in the tire axial direction in the bead portion 4. For example, the tire 1 is for a passenger car, and used as a run flat tire capable of running if the tire is punctured.

In this specification and claims, dimensions of respective parts of the tire 1 refer to values under a normal state unless otherwise noted. The "normal state" means a state of the tire 1 which is mounted on a normal rim (not shown), inflated to a normal inner pressure, and loaded with no load.

The "normal rim" means a wheel rim specified for the tire by a standard included in a standardization system on which the tire is based, for example, the "standard rim" in JATMA, "Design Rim" in TRA, and "Measuring Rim" in ETRTO.

The "normal inner pressure" means air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The carcass 6 is composed of at least one carcass ply. The carcass 6 in this embodiment comprises an inner ply 6A disposed in an inner side in the tire radial direction at the position of the tire equator C, and an outer ply 6B disposed outside the inner ply 6A. For example, each carcass ply comprises a plurality of organic fiber cords arranged at an angle of 70 to 90 degrees with respect to the tire equator C.

Figure 2:
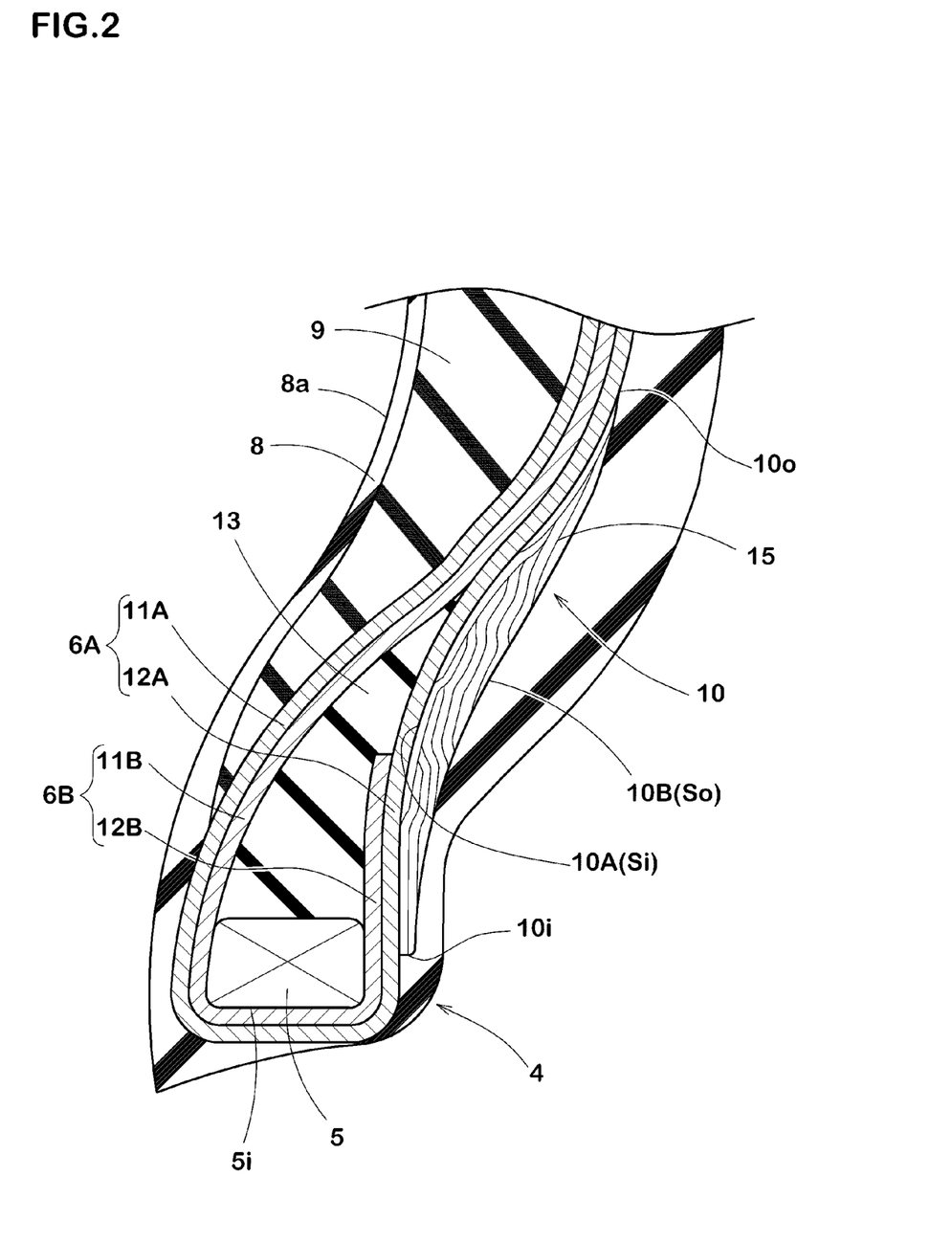
FIG. 2
An enlarged cross sectional view of the bead portion in FIG. 1.

In FIG. 2, there is shown an enlarged cross sectional view of the bead portion 4 in FIG. 1. As shown in FIG. 1 or FIG. 2, for example, the inner ply 6A comprises a main portion 11A extending between the bead portions 4 and a turned up portion 12A turned up around the bead core 5 from the inside to the outside in the tire axial direction.

Similarly to the inner ply 6A, the outer ply 6B comprises a main portion 11B and a turned up portion 12B.

As shown in FIG. 1, for example, the belt layer 7 comprises two belt plies 7A and 7B. Each belt ply 7A, 7B comprises a plurality of belt cords arranged at an angle of 10 to 40 degrees with respect to the tire equator C. The belt plies 7A and 7B are overlapped and oriented so that the belt cords cross each other.

As the belt cords in this embodiment, steel cords or if desired high modulus organic fiber cords, e.g. aramid, rayon and the like are used.

For example, the inner liner 8 is disposed between the bead portions 4, 4 in a toroidal fashion so as to form a substantially entire area of the tire inner surface 8a. For the inner liner 8, a rubber composition superior in air-impermeability is used to keep the inner pressure of the tire 1. For example, such rubber composition is formed from a butyl-based rubber whose rubber contains not less than 50 parts by mass of halogenated butyl.

Between the turned up portion 12B and the main portion 11B of the outer ply 6B, there is disposed a bead apex rubber 13 extending from the bead core 5 toward the outside in the tire radial direction in a tapered manner.

The bead apex rubber 13 is made of hard rubber in order to increase the bending rigidity of the bead portion 4.
It is preferable that such hard rubber has a rubber hardness of 60 to 95 degrees, for example.

The "hardness of rubber" is a type-A durometer hardness according to JIS-K6253 in an environment at 23 deg. C.

For example, on the inside in the tire axial direction of the carcass 6, the side reinforcing rubber layer 9 extends continuously in the tire circumferential direction. The side reinforcing rubber layer 9 is formed in a substantially crescent cross sectional shape whose thickness is gradually decreased from a central portion toward the inner end 9i and the outer end 9o in the tire radial direction.

The thickness is measured in a normal direction to the main portion 11A of the inner ply 6A of the carcass 6.

For example, the inner end 9i of the side reinforcing rubber layer 9 is positioned inside in the tire radial direction of the outer end in the tire radial direction of the bead apex rubber 13 and outside in the tire radial direction of the bead core 5.

For example, the outer end 9o of the side reinforcing rubber layer 9 is positioned inside in the tire axial direction of the outer end in the tire axial direction of the belt layer 7.

The side reinforcing rubber layer 9 increases the bending rigidity of the sidewall portion 3 and is able to effectively reduce vertical deflections of the tire during run flat traveling.

In order to effectively derive such function, it is preferred that the side reinforcing rubber layer 9 has a hardness of rubber of 60 to 95 degrees, for example.

As shown in FIG. 2, in the bead portion 4, the bead reinforcing rubber layer 10 extends continuously in the tire circumferential direction on the outside in the tire axial direction of the carcass 6.

For example, the bead reinforcing rubber layer 10 has a shape such that the thickness gradually decreases from a central portion toward an inner end 10i and an outer end 10o in the tire radial direction. The thickness is measured in the normal direction to the turned up portion 12A of the inner ply 6A of the carcass 6.

For example, the inner end 10i of the bead reinforcing rubber layer 10 is positioned on the inner side in the tire radial direction of the inner end in the tire radial direction of the bead apex rubber 13, and on the outer side in the tire radial direction of the inner end 5i in the tire radial direction of the bead core 5.

For example, the outer end 10o of the bead reinforcing rubber layer 10 is positioned on the outer side in the tire radial direction of the outer end in the tire radial direction of the bead apex rubber 13, and on the inner side in the tire radial direction of a position at which the thickness of the side reinforcing rubber layer 9 is maximum.

The bead reinforcing rubber layer 10 is arranged so as to extend between the side reinforcing rubber layer 9 and the bead apex rubber 13. Thereby, the bending rigidity of the bead portion 4 is increased in a well balanced manner, and the vertical deflection of the tire during run flat traveling can be more effectively reduced.

In order to effectively derive such function, it is preferred that the bead reinforcing rubber layer 10 has a hardness of rubber of, for example, 60 to 100 degrees, more preferably 70 to 90 degrees.

The bead reinforcing rubber layer 10 in this embodiment is formed by a strip winding method, for example, so that the shape can be flexibly changed according to the tire size and the like. A strip winding method can produce rubber members having various cross sectional shapes by winding a band-like rubber strip 15 spirally circumferentially of the tire.

Accordingly, the tire 1 according to the present invention possesses good production efficiency.

Figure 3:
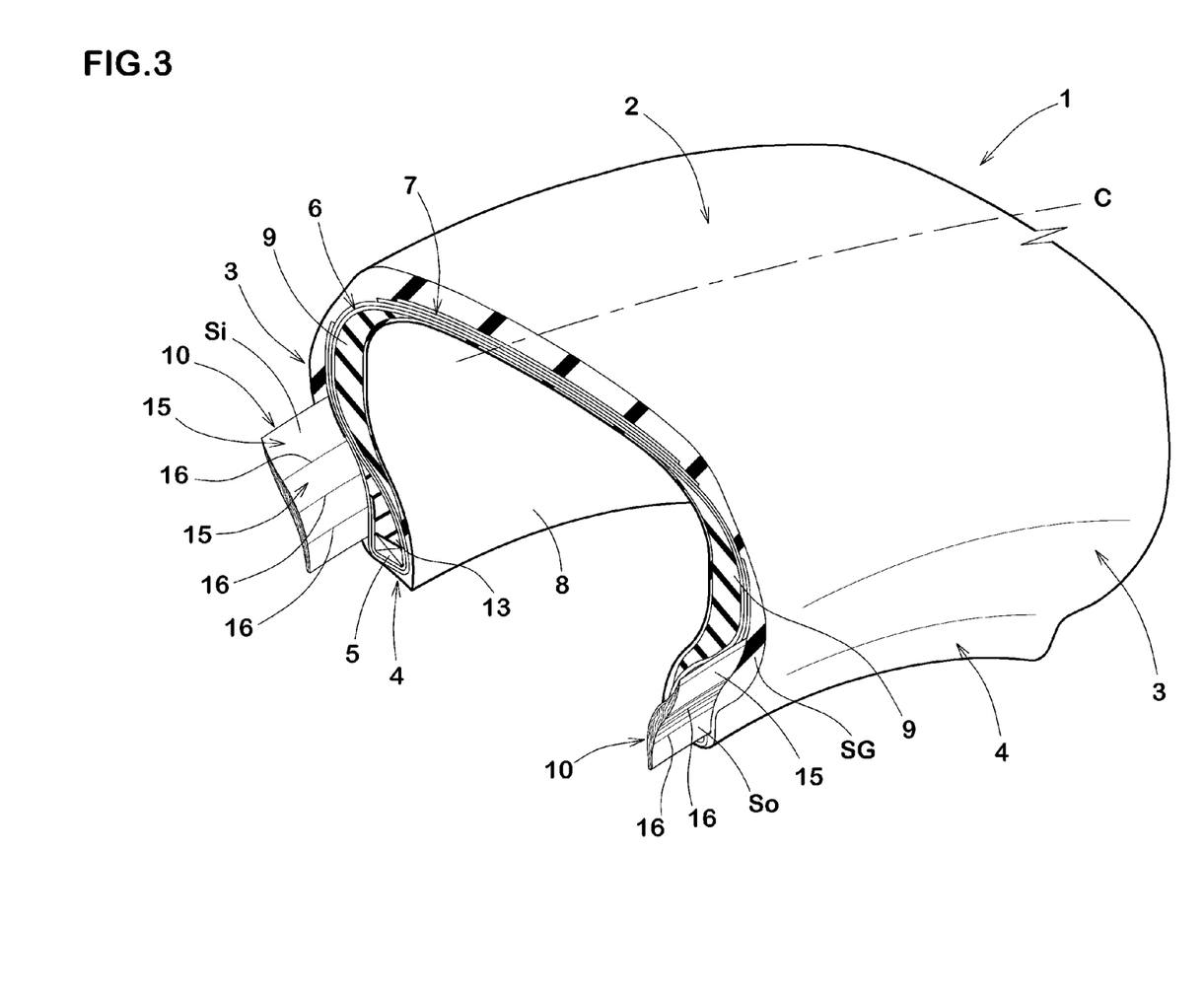
FIG. 3
A perspective view of a part of the pneumatic tire.

In FIG. 3, a partial perspective view of the tire 1 is shown. As shown in FIG. 2 or 3, in a tire meridian section, the bead reinforcing rubber layer 10 comprises an inner surface Si and an outer surface So in the tire axial direction.

In each of the inner surface Si and the outer surface So of the bead reinforcing rubber layer 10, adjacent rubber strip 15's interfaces 16 appear. In this embodiment, for example, three interfaces 16 appear in the inner surface Si, and seven interfaces 16 appear in the outer surface So.

In the bead reinforcing rubber layer 10 in the tire meridian section, accordingly, the number of the interfaces 16 in the inner surface Si is smaller than the number of the interfaces 16 in the outer surface So.

In such bead reinforcing rubber layer 10, the number of the interfaces 16 from which damage is liable to start becomes relatively small in the inner surface Si on which large tensile stress acts during running. Accordingly, the durability performance of the bead reinforcing rubber layer 10 formed by the strip winding method is improved. Such tire 1 exhibits excellent durability performance during run flat traveling after inner pressure is lost.

For example, as shown in FIG. 2, the bead reinforcing layer 10 comprises an inside laminated body 10A comprising the inner surface Si and an outside laminated body 10B comprising the outer surface So. Each laminated body 10A, 10B is a mass of overlapped windings of the rubber strip 15.

Figure 4:
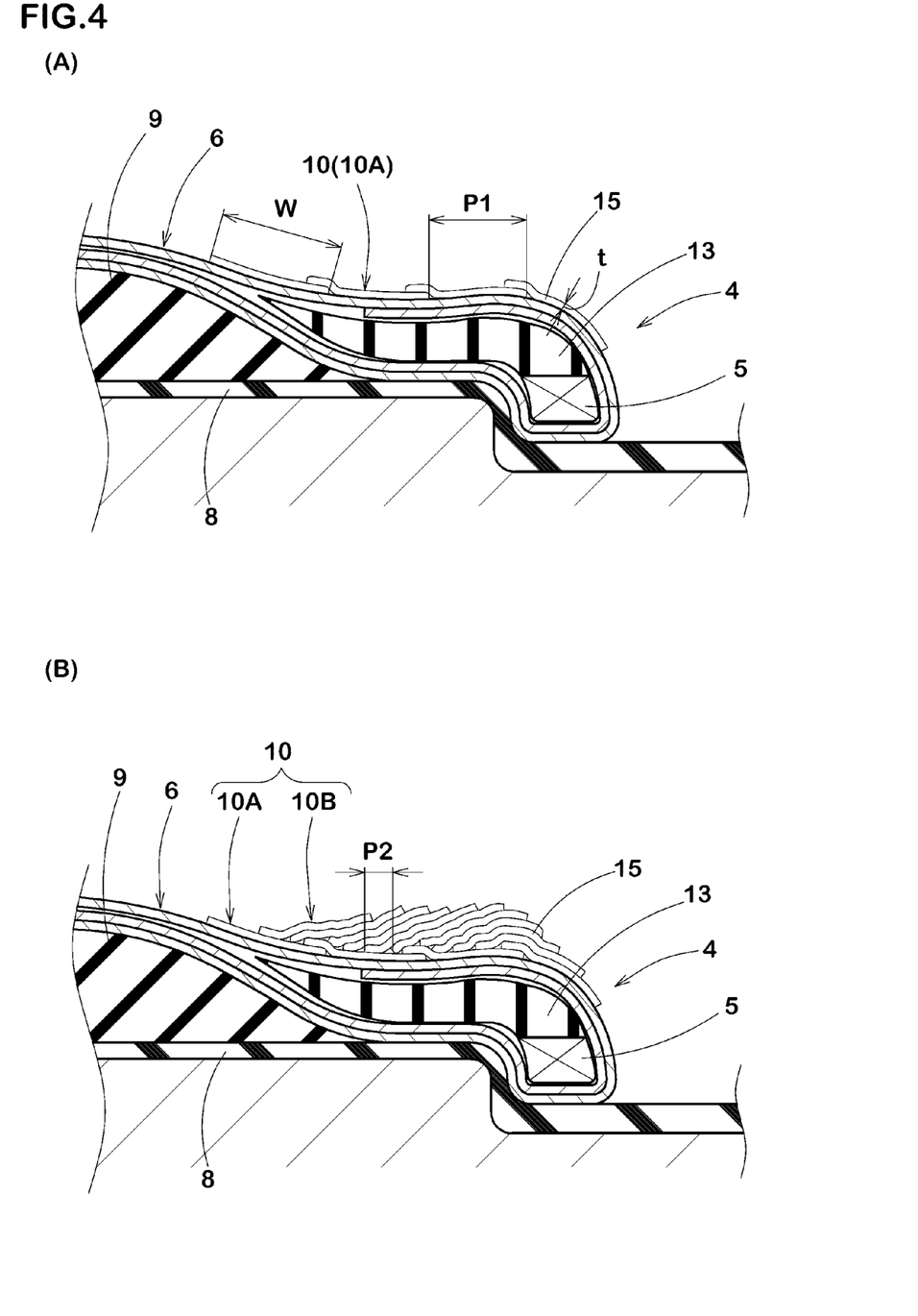

In FIG. 4 (A), there is shown a process for producing the inside laminated body 10A of the bead reinforcing rubber layer 10 in a method for manufacturing a tire raw cover.

In FIG. 4 (B), a process for producing the outside laminated body 10B is shown.

As shown in FIG. 3, FIG. 4 (A) or FIG. 4 (B), the bead reinforcing rubber layer 10 is formed by overlap winding the rubber strip 15, for example, along an outer surface of the turned up portion of the carcass ply of the raw tire.

For example, on the outside of the bead reinforcing rubber layer 10, rubber members, e.g. sidewall rubber SG and the like are applied to manufacture the raw tire. The raw tire is vulcanized in accordance with customary practice, and the tire 1 is manufactured.

The inside laminated body 10A comprises the rubber strip 15 spirally wound from the outside to the inside in the tire radial direction, for example, along the turned up portion 12A of the inner ply 6A.

The outside laminated body 10B comprise the rubber strip 15 wound from the inside to the outside in the tire radial direction, for example, along the inside laminated body 10A. For example, it is preferable that the inside laminated body 10A and the outside laminated body 10B are formed from a single continuous rubber strip 15.

As shown in FIG. 4 (A) or FIG. 4 (B), in the inside laminated body 10A, the rubber strip 15 is wound at an helical pitch P1, for example. In the outside laminated body 10B, the rubber strip 15 is wound at an helical pitch P2, for example. The helical pitch P1 of the inside laminated body 10A is larger than the helical pitch P2 of the outside laminated body 10B. Thereby, the number of the interfaces 16 in the inner surface Si of the bead reinforcing rubber layer 10 can be easily decreased to under the number of the interfaces 16 in the outer surface So of the bead reinforcing rubber layer 10.

For example, in the inside laminated body 10A, it is preferable that the ratio (P1/w) of the helical pitch P1 and the width w of the rubber strip 15 is in a range of 0.5 to 0.8. If the ratio (P1/w) is less than 0.5, there is a possibility that the number of the interfaces 16 in the inner surface Si of the bead reinforcing rubber layer 10 can not be decreased to a satisfactory extent. If the ratio (P1 /w) is more than 0.8, overlaps of the rubber strip 15 are decreased, and the rubber strip 15 is liable to separate at the interfaces 16.

Based on this standpoint, the ratio (P1/w) is more preferably in a range of 0.6 to 0.7.

In the outside laminated body 10B, it is preferable that the ratio (P2/w) of the helical pitch P2 and the width w of the rubber strip 15 is less than the ratio (P1/W). For example, the ratio (P2/w) is less than 0.5, more preferably in a range of 0.2 to 0.4. The thickness in the tire axial direction of the outside laminated body 10B is more than that of the inside laminated body 10A. Therefore, the bead reinforcing rubber layer 10 in this embodiment is formed into a predetermined shape by winding the rubber strip 15 while making one reciprocating motion in the tire radial direction. Accordingly, in the tire 1 of the present invention, the bead reinforcing rubber layer 10 having a predetermined shape can be formed without the need for the rubber strip 15 to make more than one reciprocating motion in the tire radial direction in the strip winding method, and the production efficiency can be further improved.

For example, the rubber strip 15 is continuously extruded by an extruder (not shown).

The width w of the rubber strip 15 in this embodiment is, for example, about 5 to 30 mm.

If the width w is less than 5 mm, there is a possibility that the number of the interfaces 16 appearing in the inner surface Si of the bead reinforcing rubber layer 10 becomes large. If the width w is more than 30 mm, it becomes difficult to form the bead reinforcing rubber layer 10 into a predetermined shape.

Based on this standpoint, the width w of the rubber strip is more preferably 5 to 20 mm.

The thickness t of the rubber strip 15 in this embodiment is about 0.5 to 2.0 mm for example.

If the thickness t is less than 0.5 mm, there is a possibility that a vertical load acts on the outside laminated body 10B through the inside laminated body 10A of the bead reinforcing rubber layer 10. If the thickness t is more than 2.0 mm, it becomes difficult to form the bead reinforcing rubber layer 10 into a predetermined shape.

Based on this standpoint, the thickness t of the rubber strip is more preferably 0.5 to 1.0 mm.

In the above described embodiment, the helical pitch P1, P2 of the rubber strip 15 in the bead reinforcing rubber layer 10 differs between the inside laminated body 10A and the outside laminated body 10B in order to decrease the number of the interfaces 16 in the inner surface Si to under the number of the interfaces 16 in the outer surface So.

However, in the tire 1 of the present invention, it may be possible to decrease the number of the interfaces 16 in the inner surface Si to under the number of the interfaces 16 in the outer surface So, for example, by changing the width or thickness of the rubber strip 15 between the inside laminated body 10A and the outside laminated body 10B instead of changing the helical pitch P1, P2 of the rubber strip 15.

While detailed description has been made of especially preferable embodiments of the present invention, the embodiments should not be construed as to limit the scope of the present invention; the present invention may be embodied in various forms.

WORKING EXAMPLES

Based on specifications in Table 1, run flat tires for passenger car having the basic structure shown in FIGS. 1 to 3 were experimentally manufactured and tested for their performances.

For comparison, a tire (comparative example 1) having a bead reinforcing rubber layer formed by winding a rubber strip toward one tire radial direction was experimentally manufactured and tested in the same manner. In the comparative example 1 tire, the ratio of the width of the rubber strip and the helical pitch in the bead reinforcing rubber layer was 0.3.

Main specifications common to working examples are as follows.
- tire size: 245/40R18
- wheel rim size: 8j
- rubber strip width w: 20 mm
- rubber strip thickness: 1 mm
- ratio (P2/w): 0.3

The run flat durability performance was carried out on each test tire mounted on the above-mentioned wheel rim without the valve core by a step-up speed method according to the Procedure for Load/speed Performance Tests of ECE-30 under zero inner pressure state using a drum tester. In the test, the running speed was gradually increased, and the speed and the time until the tire was broken were measured. The evaluation is indicated by an index based on Comparative example 1 being 100. The larger the value, the better the run flat durability performance.

TABLE 1

|  | Comparative example 1 | Working example 1 | Working example 2 | Working example 3 | Working example 4 | Working example 5 | Working example 6 | Working example 7 |
|---|---|---|---|---|---|---|---|---|
| Number of Interfaces in Inner surface of Bead-reinforcing rubber layer | 15 | 11 | 9 | 7 | 6 | 6 | 5 | 4 |
| Number of interfaces in Outer surface of Bead-reinforcing rubber layer | 15 | 15 | 15 | 15 | 15 | 15 | 15 | 15 |
| Ratio (P1/W) | — | 0.40 | 0.50 | 0.60 | 0.65 | 0.70 | 0.80 | 0.90 |
| Run flat durability performance (index) | 100 | 105 | 120 | 125 | 125 | 125 | 130 | 140 |

As shown in Table 1, it was confirmed that working example tires were improved in the run flat durability performance.

DESCRIPTION OF THE SIGNS

1—pneumatic tire
4—bead portion
6—carcass
10 bead reinforcing rubber layer
15 rubber strip
16—interface
Si—inner surface
So—outer surface

The invention claimed is:

1. A pneumatic tire having a toroidal carcass extending from a tread portion to a bead core in a bead portion through a sidewall portion, and characterized in that
    the bead portion is provided with a bead reinforcing rubber layer disposed along an outer surface in the tire axial direction of the carcass,
    the bead reinforcing rubber layer is formed from a band-like rubber strip wound spirally circumferentially of the tire,
    in a tire meridian section including the tire rotational axis, an inner surface and an outer surface in the tire axial direction of the bead reinforcing rubber layer each have adjacent rubber strip's interfaces, and
    the number of the interfaces in the inner surface is smaller than the number of the interfaces in the outer surface.

2. The pneumatic tire according to claim 1, wherein the bead reinforcing rubber layer comprises an inside laminated body comprising the inner surface and an outside laminated body comprising the outer surface, and
    an helical pitch P1 of the rubber strip of the inside laminated body is more than an helical pitch P2 of the rubber strip of the outside laminated body.

3. The pneumatic tire as set forth in claim 2, wherein the inside laminated body comprises a rubber strip wound from the outside to the inside in the tire radial direction,
    the outside laminated body comprises a rubber strip wound from the inside to the outside in the tire radial direction, and
    the inside laminated body and the outside laminated body is formed from a single continuous rubber strip.

4. The pneumatic tire as set forth in claim 2, wherein, in the inside laminated body, the ratio (P1/W) of the helical pitch P1 of the rubber strip and the width W of the rubber strip is set in a range of 0.5 to 0.8.

5. The pneumatic tire as set forth in claim 1, wherein the width of the rubber strip is set in a range of 5 to 30 mm.

6. The pneumatic tire as set forth in claim 1, wherein a hardness of rubber of the strip laminated body is 60 to 100 degrees.

7. The pneumatic tire as set forth in claim 3, wherein, in the inside laminated body, the ratio (P1/W) of the helical pitch P1 of the rubber strip and the width W of the rubber strip is set in a range of 0.5 to 0.8.

8. The pneumatic tire as set forth in claim 2, wherein the width of the rubber strip is set in a range of 5 to 30 mm.

9. The pneumatic tire as set forth in claim 3, wherein the width of the rubber strip is set in a range of 5 to 30 mm.

10. The pneumatic tire as set forth in claim 4, wherein the width of the rubber strip is set in a range of 5 to 30 mm.

11. The pneumatic tire as set forth in claim 2, wherein a hardness of rubber of the strip laminated body is 60 to 100 degrees.

12. The pneumatic tire as set forth in claim 3, wherein a hardness of rubber of the strip laminated body is 60 to 100 degrees.

13. The pneumatic tire as set forth in claim 4, wherein a hardness of rubber of the strip laminated body is 60 to 100 degrees.

14. The pneumatic tire as set forth in claim 5, wherein a hardness of rubber of the strip laminated body is 60 to 100 degrees.

\* \* \* \* \*